United States Patent
Shiina et al.

(10) Patent No.: US 11,015,321 B2
(45) Date of Patent: May 25, 2021

(54) OPERATIONAL DATA STORAGE DEVICE (71) Applicant: HITACHI CONSTRUCTION MACHINERY CO., LTD., Tokyo (JP)

(72) Inventors: Takeshi Shiina, Moriya (JP); Hiroshi Kanezawa, Kashiwa (JP); Hirofumi Migita, Adachi (JP); Shintaro Doi, Tsuchiura (JP); Toshiakira Takahashi, Abiko (JP); Masatoshi Sakurai, Abiko (JP); Yoshitaka Yanase, Tsuchiura (JP); Akiko Maeno, Abiko (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 170 days.

(21) Appl. No.: 16/328,903

(22) PCT Filed: Feb. 13, 2018

(86) PCT No.: PCT/JP2018/004805
§ 371 (c)(1),
(2) Date: Feb. 27, 2019

(87) PCT Pub. No.: WO2018/179918
PCT Pub. Date: Oct. 4, 2018

(65) Prior Publication Data
US 2019/0186104 A1 Jun. 20, 2019

(30) Foreign Application Priority Data
Mar. 28, 2017 (JP) .............................. JP2017-063479

(51) Int. Cl.
*E02F 9/20* (2006.01)
*E02F 3/43* (2006.01)
(Continued)

(52) U.S. Cl.
CPC ............. *E02F 9/2095* (2013.01); *E02F 3/435* (2013.01); *E02F 9/24* (2013.01); *E02F 9/26* (2013.01);
(Continued)

(58) Field of Classification Search
CPC ... E02F 9/2095; E02F 9/26; E02F 9/24; E02F 3/435; E02F 9/264; E02F 9/2004;
(Continued)

(56) References Cited

U.S. PATENT DOCUMENTS 8,473,143 B2    6/2013   Stark et al.
8,864,101 B1 *  10/2014  Buckner ................ F15B 11/15
                                                            251/59

(Continued)

FOREIGN PATENT DOCUMENTS

EP    2 578 757 A1    4/2013
JP    09-279632 A     10/1997
(Continued)

OTHER PUBLICATIONS

International Search Report of PCT/JP2018/004805 dated Mar. 13, 2018.

*Primary Examiner* — Mussa A Shaawat
(74) *Attorney, Agent, or Firm* — Mattingly & Malur, PC (57) ABSTRACT

An operational data storage device mounted on an hydraulic excavator is programmed to store operational data including stroke data and movement quantity data. The stroke data represent input operations by the operator of the hydraulic excavator through electric operating levers, and the movement quantity data represent movement quantities of operating members for a front working device equipped with the hydraulic excavator, the operating member being operated according to the input operations. The operational data storage device stores, in an initial state, the operational data (Continued)

in the volatile storage section, generates a save and exit signal if a posture parameter detected at a posture detection sensor included in the hydraulic excavator exceeds a predetermined posture threshold, and responsive to the save and exit signal, switches a write destination of the operational data from the volatile storage section to the non-volatile storage section.

3 Claims, 6 Drawing Sheets (51) Int. Cl.
  *E02F 9/26* (2006.01)
  *G06F 3/06* (2006.01)
  *G06F 11/14* (2006.01)
  *E02F 9/24* (2006.01)
(52) U.S. Cl.
  CPC ............ *E02F 9/264* (2013.01); *G06F 3/0604* (2013.01); *G06F 3/068* (2013.01); *G06F 3/0659* (2013.01); *G06F 11/14* (2013.01)
(58) Field of Classification Search
  CPC ........ G06F 11/14; G06F 3/0604; G06F 3/068; G06F 3/0659; G07C 5/085
  See application file for complete search history.

(56) References Cited

U.S. PATENT DOCUMENTS

| | | | | |
|---|---|---|---|---|
| 10,165,053 | B2* | 12/2018 | Fujiwara | ............... E02F 9/2054 |
| 2003/0147727 | A1 | 8/2003 | Fujishima et al. | |
| 2004/0186687 | A1* | 9/2004 | Ogura | ................ G05B 23/0267 |
| | | | | 702/185 |
| 2005/0150142 | A1* | 7/2005 | Matsuda | ................... E02F 9/26 |
| | | | | 37/414 |
| 2009/0062993 | A1* | 3/2009 | Morey | ................... E02F 3/6436 |
| | | | | 701/50 |
| 2009/0198409 | A1* | 8/2009 | Rector | ................... G07C 5/085 |
| | | | | 701/33.4 |
| 2010/0196129 | A1* | 8/2010 | Buckner | ................... E02F 3/94 |
| | | | | 414/467 |
| 2011/0227744 | A1* | 9/2011 | Shibata | ................... G07C 5/085 |
| | | | | 340/679 |
| 2014/0200863 | A1* | 7/2014 | Kamat | ................... G06T 19/00 |
| | | | | 703/1 |
| 2015/0240458 | A1 | 8/2015 | Nagato et al. | |
| 2015/0293702 | A1* | 10/2015 | Fujimori | ............... G06F 3/0604 |
| | | | | 711/154 |
| 2015/0301518 | A1* | 10/2015 | Takemoto | ............ G05B 19/408 |
| | | | | 701/29.1 |
| 2015/0371464 | A1* | 12/2015 | Fujimori | ............... E02F 9/2054 |
| | | | | 701/29.1 |
| 2016/0078363 | A1* | 3/2016 | Hodel | ................ G05B 13/0265 |
| | | | | 706/12 |
| 2017/0372534 | A1* | 12/2017 | Steketee | ................. G07C 5/008 |
| 2018/0005461 | A1 | 1/2018 | Steketee et al. | |
| 2018/0130222 | A1* | 5/2018 | Tafazoli Bilandi | ....... G06T 7/70 |
| 2018/0179739 | A1* | 6/2018 | Berry | .................... G01L 5/0071 |

FOREIGN PATENT DOCUMENTS

| | | |
|---|---|---|
| JP | 2002-290596 A | 10/2002 |
| JP | 2007-153033 A | 6/2007 |
| JP | 2010-037036 A | 2/2010 |
| WO | 03/000997 A1 | 1/2003 |
| WO | 2016/115499 A1 | 7/2016 |
| WO | 2017/042897 A1 | 3/2017 |

\* cited by examiner

OPERATIONAL DATA STORAGE DEVICE

TECHNICAL FIELD

This invention relates to an operational data storage device for a work machine.

BACKGROUND ART

Patent Document 1 discloses a system that keeps logging of images before and after an accident on a mining work machine with body frame control data. In an example disclosed in this patent document, an obstacle is detected using a camera disposed on a construction machine, the detection result is compared with an electronic map, and based on the comparison, logging of images with body frame control data is made.

PRIOR ART DOCUMENT

Patent Document

Patent Document 1: U.S. Pat. No. 8,473,143 B2

DISCLOSURE OF THE INVENTION

Problem to Be Solved by the Invention

Concerning a hydraulic excavator for operation in a mine, there is an outstanding desire to make logging of sensor data representing operational status of the hydraulic excavator, for example, for the analysis of a cause of a fall accident in bench cutting or for the analysis of the operational status toward improved productivity. Nonetheless, it is difficult to store sensor data over the entire period during operation of the hydraulic excavator because a data storage device is generally limited in storage capacity.

The logging system of Patent Document 1 makes logging based on the comparison between the detection result of the obstacle and the electronic map. Upon initiation of the logging of operational data for the above-described analysis on the hydraulic excavator, it is, however, not necessarily relevant whether the obstacle exists or not. Therefore, the logging technique of Patent Document 1 cannot be applied, as it is, to the analysis of operational status of a hydraulic excavator so that the problem of failing to meet the above-described desire remains unsolved.

The present invention has been made to resolve the above-described problem, and has as an object thereof the provision of a technique suited for the logging of operational data of a work machine.

Means for Solving the Problem

The present invention provides an operational data storage device for storing operational data of a hydraulic excavator including an undercarriage, an upperstructure disposed so as to revolve on the undercarriage and an articulated front working device raisably and lowerably disposed on the upperstructure. The hydraulic excavator includes a plurality of potentiometers that are provided on respective operating levers formed of electric levers and configured to operate respective operating members, which construct the front working device, and the upperstructure so that stroke signals are generated corresponding to input operations by an operator, a plurality of proportional solenoid valves that drive a plurality of actuators which actuate the respective operating members and upperstructure in correspondence to the stroke signals from the potentiometers, a main controller that controls the proportional solenoid valves responsive to the control signals, a plurality of angle sensors that detect movement quantities of the respective operating members and the upperstructure which are operated via the proportional solenoid valves, and a posture detection sensor that detects a posture parameter of the hydraulic excavator. The operational data storage device includes a storage controller including a volatile storage section and a non-volatile storage section. The storage controller is connected to the main controller, and is programmed to store operational data that include stroke data, which represents input operations by the operator of the hydraulic excavator for at least one of the respective operating members and the upperstructure through the corresponding operating lever, and movement quantity data representing a movement quantity of the at least one of the respective operating members and the upperstructure, which operates according to the input operation. The storage controller stores, in an initial state, the operational data in the volatile storage section, outputs a save and exit signal if the posture parameter detected at the posture detection sensor exceeds a predetermined posture threshold, and switches, responsive to the save and exit signal, a write destination of the operational data from the volatile storage section to the non-volatile storage section.

Advantageous Effects of the Invention

According to the present invention, a technique suited for the logging of operational data of a work machine can be provided. Objects, configurations and advantageous effects other than those described above will become apparent from the following description of an embodiment.

MODES FOR CARRYING OUT THE INVENTION

The embodiment of the present invention will hereinafter be described in detail based on the drawings. Throughout all the figures for describing the embodiment, members having the same functions are designated by as signing the same or related numerals or signs, and their repeated descriptions are omitted. In the following embodiment, descriptions of the same or similar elements will not be repeated in principle unless specifically needed.

Figure 1:
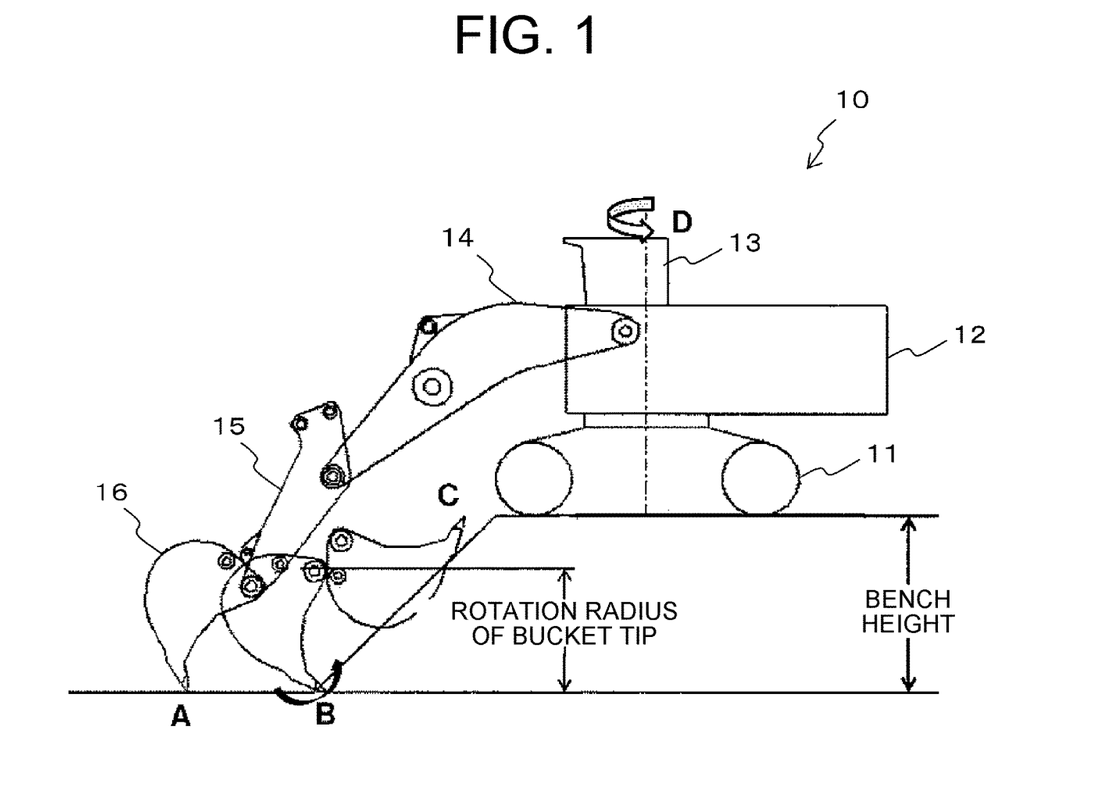
FIG. 1 is an external excavator view of a hydraulic
Figure 2:
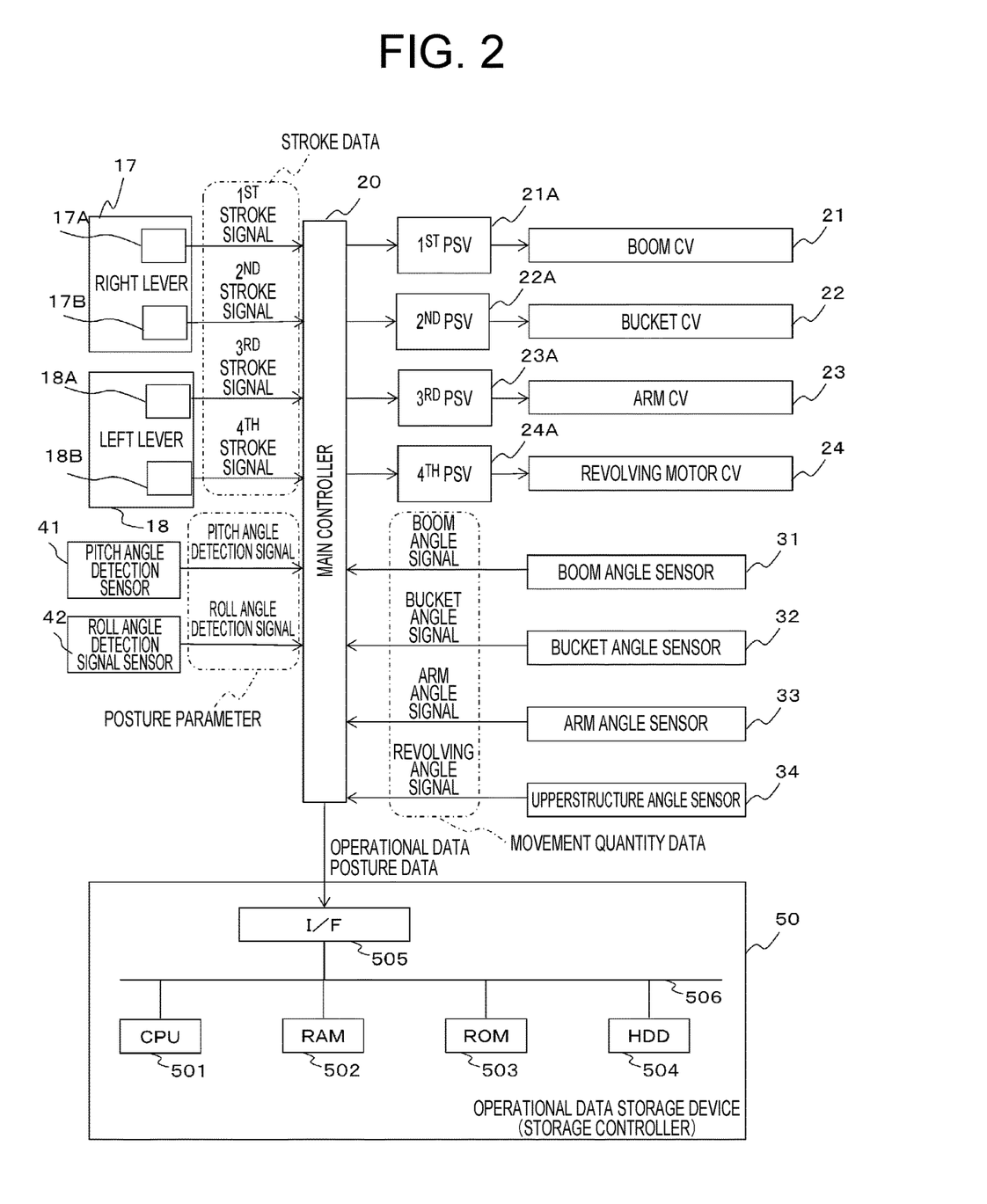
FIG. 2 is a block diagram illustrating internal configurations of the hydraulic excavator.

This embodiment makes logging of operational data of a hydraulic excavator, which are useful for the analysis of a fall accident of the hydraulic excavator from a bench during bench cutting. With reference to FIGS. 1 and 2, a description will first be made about outline configurations of the hydraulic excavator. FIG. 1 is an external view of the hydraulic excavator. FIG. 2 is a block diagram illustrating internal configurations of the hydraulic excavator.

Configurations of the hydraulic excavator 10 are illustrated in FIG. 1. As illustrated in FIG. 1, the hydraulic excavator 10 includes an undercarriage 11 having a pair of left and right crawlers, an upperstructure 12 supported so as to revolve on the undercarriage 11, a cab 13 mounted on the upper structure 12, and an articulated front working device raisably and lowerably attached to the upperstructure 12. The front working device includes a boom 14 supported pivotally up and down relative to the upperstructure 12, an arm 15 supported pivotally up and down on the boom 14, and a bucket 16 pivotally supported on the arm 15. Further, unillustrated hydraulic motor and hydraulic cylinders are also included as actuators for performing traveling with the undercarriage 11, revolving of the upperstructure 12, and pivoting of the boom 14, arm 15 and bucket 16, respectively. The hydraulic motor is provided for revolving or the like, while the hydraulic cylinders are provided for causing the boom 14 and the like to pivot. It is to be noted that a hydraulic actuation system is assumed herein but an electric actuation system such as, for example, electric motors or linear actuators may also be used without being limited to such a hydraulic actuation system.

In the cab 13, operating levers consisting of a right lever 17 and a left lever 18 illustrated in FIG. 2 are configured. Forward or backward operation of the right lever 17 lowers or raises the boom 14, leftward or rightward operation of the right lever 17 lowers or raises the bucket 16, forward or backward operation of the left lever 18 causes the arm 15 to pivot outward or inward, and leftward or rightward operation of the left lever 18 causes the upperstructure 12 to revolve counterclockwise or clockwise. The right lever 17 and left lever 18 are operating levers formed of electric levers.

A hydraulic excavator for operation in a mine is a so-called super jumbo excavator having a tare weight as much as 100 tons or greater, and generally uses operating levers of an electric lever type that proportional solenoid valves are actuated by stoke signals from potentiometers, which convert strokes of the operating levers into corresponding electrical signals and output them, and control valves are actuated by pilot pressure signals outputted from the proportional solenoid valves. Accordingly, the stroke signals outputted from the potentiometers correspond to the pilot pressure signals outputted from the proportional solenoid valves. In general, an electric lever has potentiometers built in beforehand corresponding to its operating directions, and is configured to output signals from the potentiometers.

If the right lever 17 and left lever 18 as electric operating levers are operated, pilot pressure signals that represent the strokes of the respective levers are outputted to a main controller 20. These pilot pressure signals will hereinafter be called "the first stroke signal" outputted from a first potentiometer 17A and representing a pilot pressure corresponding to a forward or backward stroke of the right lever, "the second stroke signal" outputted from a second potentiometer 17B and representing a pilot pressure corresponding to a leftward or rightward stroke of the right lever, "the third stroke signal" outputted from a third potentiometer 18A and representing a pilot pressure corresponding to a forward or backward stroke of the left lever, and "the fourth stroke signal" outputted from a fourth potentiometer 18B and representing a pilot pressure corresponding to a leftward or rightward stroke of the left lever.

The first control signal to the fourth control signal are inputted to a first proportional solenoid valve (PSV) 21A, second proportional solenoid valve (PSV) 22A, third proportional solenoid valve (PSV) 23A and fourth proportional solenoid valve (PSV) 24A, respectively, via the main controller 20. The first proportional solenoid valve 21A, second proportional solenoid valve 22A, third proportional solenoid valve 23A and fourth proportional solenoid valve 24A then generate pilot pressures corresponding to the first stroke signal to the fourth stroke signal, respectively, and the pilot pressures so generated are outputted to a boom control valve (CV) 21, bucket control valve (CV) 22, arm control valve (CV) 23, and revolving motor control valve (CV) 24, respectively. As a consequence, operations by an operator are transmitted, via the respective control valves, to individual hydraulic actuators that include an unillustrated revolving motor, boom cylinder, arm cylinder and bucket cylinder.

The hydraulic excavator 10 includes a boom angle sensor 31, bucket angle sensor 32, arm angle sensor 33, and upperstructure angle sensor 34. A boom angle signal, bucket angle signal, arm angle signal and revolving angle signal detected by the respective sensors are outputted to the main controller 20.

The rotation radius of a bucket tip illustrated in FIG. 1 can be calculated based on a bucket angle and bucket dimensions. On the other hand, a bench height can be calculated using a boom length, arm length, bucket dimensions, boom angle and arm angle and the rotation radius of the bucket tip. The operational status of the hydraulic excavator can be verified by analyzing the rotation radius of the bucket tip and the bench height.

The boom angle, arm angle, bucket angle and revolving angle represent actual operation quantities of the boom 14, arm 15, bucket 16 and upperstructure 12. On the other hand, the first stroke signal to fourth stroke signal represents strokes which the operator has inputted to operate the hydraulic excavator 10. If the boom 14, arm 15, bucket 16 and upperstructure 12 are free of restrictions on movements, the strokes and actual operation quantities correspond each other. However, if the operator continues to tilt the right lever leftward, for example, although the bucket has already been in contact with a hard ground and cannot be lowered or crowded further, the bucket angle does not change corresponding to the stroke so that the response of the bucket angle to the stroke is lowered. Because the stroke and the actual operation quantity do not always match each other as described above, the level of a mismatch may be observed and the operational data may be saved. About this saving, a description will be made subsequently herein. Hereinafter, the first stroke signal to fourth stroke signal will be collectively called "the stroke data", and the boom angle signal, arm angle signal, bucket angle signal and revolving angle signal will be collectively called "the movement quantity data". Further, the stroke data and movement quantity data will be collectively called "the operational data".

The hydraulic excavator 10 includes, as posture detection sensors, a pitch angle detection sensor 41 and roll angle detection sensor 42. A pitch angle detection signal detected by the pitch angle detection sensor 41 and a roll angle detection signal detected by the roll angle detection sensor 42 are outputted to the main controller 20. Hereinafter, the pitch angle detection signal and roll angle detection signal will be collectively called "the posture data". The pitch angle and roll angle are equivalent to posture parameters.

To the main controller 20, an operational data storage device 50 is connected. The operational data storage device 50 temporarily stores operational data in a volatile storage section at a normal time. If saving is determined to be needed, however, the operational data storage device 50 writes the operational data, which have been stored in the volatile storage section, in a non-volatile storage section, and writes operational data, which have been acquired from the main controller 20 after saving is determined to be needed, in the non-volatile storage section. The operational data storage device 50 may be configured as a device to be externally connected to an unillustrated external device I/F, for example, a USB port of the main controller 20, or may be configured as a function of the main controller 20. In this embodiment, the operational data storage device 50 is described as an externally connected device.

The operational data storage device 50 includes a central processing unit (CPU) 501, random access memory (RAM) 502, read only memory (ROM) 503, hard disk drive (HDD) 504, I/F 505, and bus 506. The operational data storage device 50 is configured of a storage controller in which the CPU 501, RAM 502, ROM 503, HDD 504 and I/F 505 are connected together via the bus 506. The operational data storage device 50 is connected to the main controller 20 via the I/F 505. The RAM 502 corresponds to the volatile storage section, while the HDD 504 corresponds to the non-volatile storage section because it continues the storage of written operational data until deletion of the data is instructed. The non-volatile storage section may also be a non-volatile memory such as an EPPROM as a replacement for the HDD.

Figure 3:
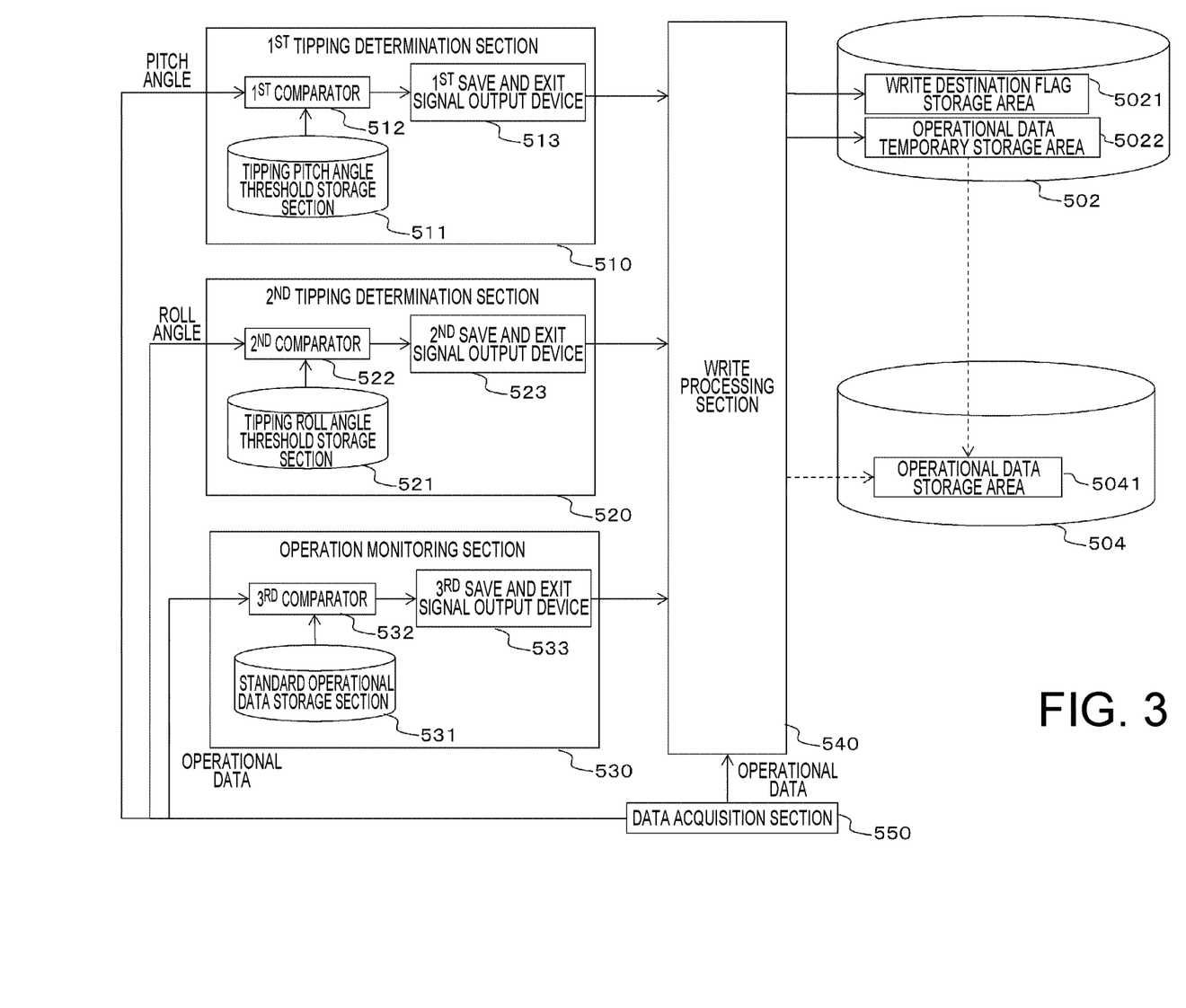
FIG. 3 is a block diagram illustrating functional configurations of an operational data storage device.

Referring to FIG. 3, a description will be made about functional configurations of the operational data storage device 50. FIG. 3 is a block diagram illustrating the functional configurations of the operational data storage device 50.

The operational data storage device 50 includes a first tipping determination section 510, second tipping determination section 520, operation monitoring section 530, write processing section 540, and data acquisition section 550. The first tipping determination section 510 performs, based on a pitch angle, tipping determination processing for the hydraulic excavator 10. The second tipping determination section 520 performs, based on a roll angle, tipping determination processing for the hydraulic excavator 10. The operation monitoring section 530 determines, based on a deviation from standard operational data, whether saving is needed. The write processing section 540 performs write processing of the operational data and performs switching of a write destination. Further, a write destination flag storage area 5021 and operational data temporary storage area 5022 are arranged in the RAM 502. An operational data storage area 5041 is arranged in the HDD 504. The first tipping determination section 510, second tipping determination section 520 and operation monitoring section 530 are equivalent to a save determination section because they switch the write destination of the operational data from the volatile storage section, i.e., the RAM 502 to the non-volatile storage device, i.e., the HDD 504.

The first tipping determination section 510 includes a tipping pitch angle threshold storage section 511, first comparator 512, and first save and exit signal output device 513. The tipping pitch angle threshold storage section 511 stores tipping pitch angle thresholds, which are equivalent to predetermined posture thresholds and have been set to determine that the hydraulic excavator 10 has tipped over. The first comparator 512 compares each pitch angle, which has been acquired from the main controller 20, with its corresponding tipping pitch angle threshold. The first save and exit signal output device 513 generates a save and exit signal upon receipt of the comparison result from the first comparator 512, and outputs it to the write processing section 540. The first comparator 512 and first save and exit signal output device 513 may be configured as discrete circuits. As an alternative, if the first tipping determination section 510 is configured of software and a CPU that executes the software, the first comparator 512 and first save and exit signal output device 513 may be configured as a combination of software, which realizes the function of the first comparator 512, and the CPU 501, which executes the software, or a combination of software, which realizes the function of the first save and exit signal output device 513, and the CPU 501, which executes the software.

The second tipping determination section 520 includes a tipping roll angle threshold storage section 521, a second comparator 522, and a second save and exit signal output device 523. The tipping roll angle threshold storage section 521 stores tipping roll angle thresholds, which are equivalent to predetermined posture thresholds and have been set to determine that the hydraulic excavator 10 has tipped over. The second comparator 522 compares each roll angle, which has been acquired from the main controller 20, with its corresponding tipping roll angle threshold. The second save and exit signal output device 523 generates a save and exit signal upon receipt of the comparison result from the second comparator 522, and outputs it to the write processing section 540.

The operation monitoring section 530 includes a standard operational data storage section 531, a third comparator 532, and a third save and exit signal output device 533. The standard operational data storage section 531 stores standard operational data specifying standard strokes, which represent standard stroke quantities and standard input operations that indicate how to support operating members such as the front working device and upperstructure at the standard stroke quantities, and standard movement quantities when the operating members have operated under conditions free of restrictions on movements. The third comparator 532 performs matching processing between individual operational data acquired from the main controller 20 and their corresponding standard operational data. The third save and exit signal output device 533 generates a save and exit signal upon receipt of the comparison result from the third comparator 532, and outputs it to the write processing section 540.

Figure 4:
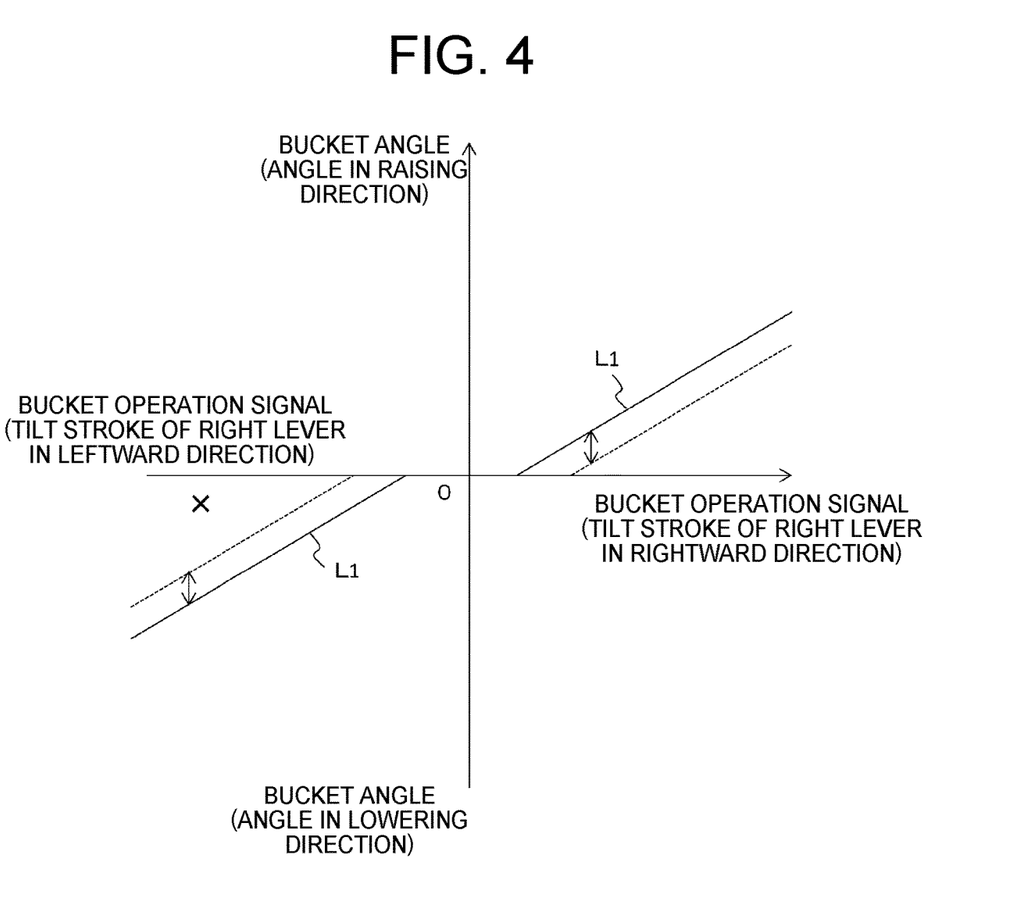
FIG. 4 is a graph illustrating an example of standard operational data.

FIG. 4 is a graph illustrating an example of standard operational data. FIG. 4 represents standard operational data that specify correlations between bucket stroke signals and bucket angles under conditions the bucket rotates free of restrictions on movement. In FIG. 4, each range defined between a dotted line and a solid line indicates an acceptable range in which an operation is regarded as a normal operation even if there is a deviation between the operational data based on the operation and its corresponding standard operational data. If the operational data departs from any of the acceptable ranges, for example, if the operational data is located at a point X in FIG. 4, an abnormal operation is determined to have been performed.

Figure 5:
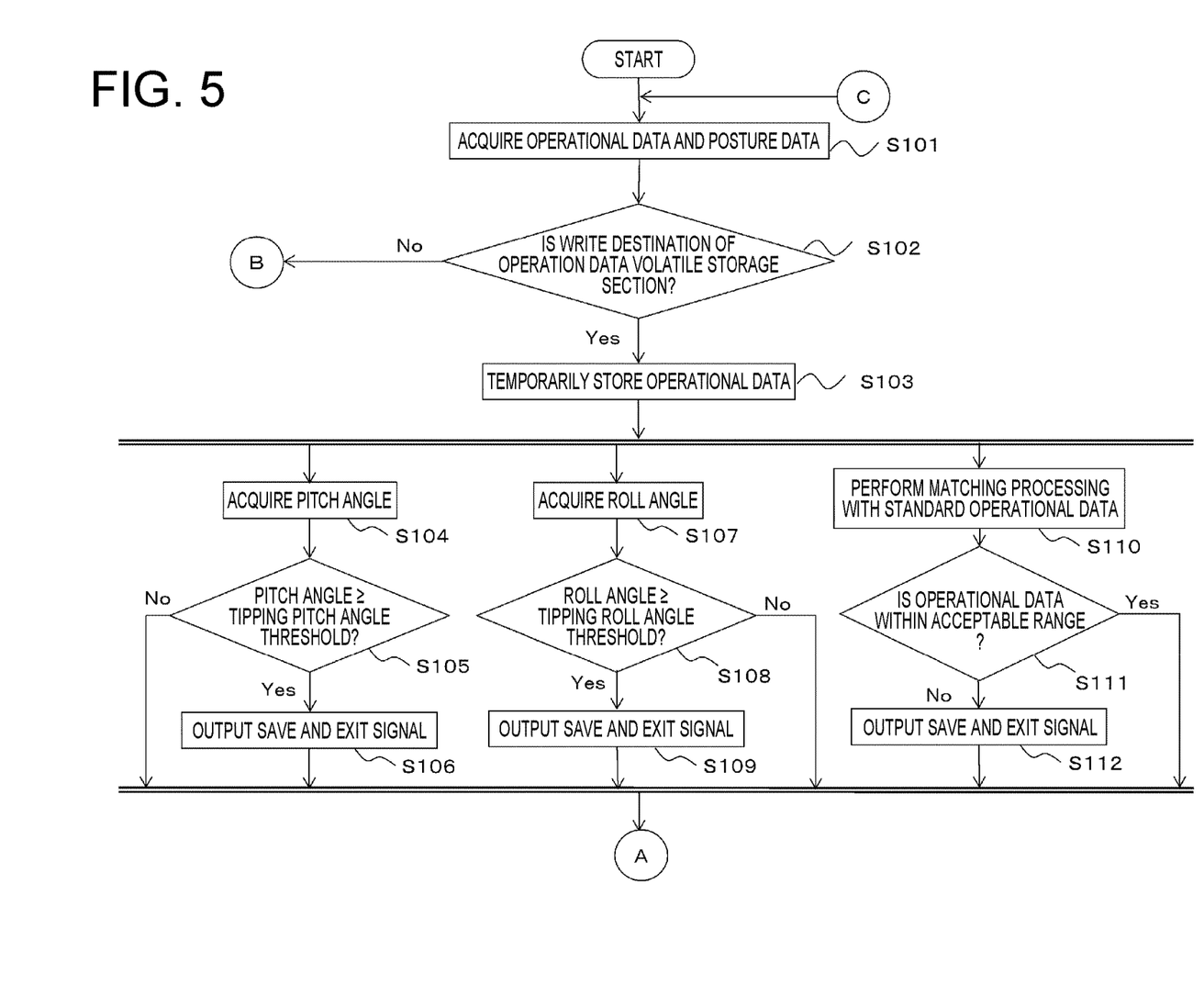
FIG. 5 is a flow chart illustrating an upper half of an operational flow of the operational data storage device.
Figure 6:
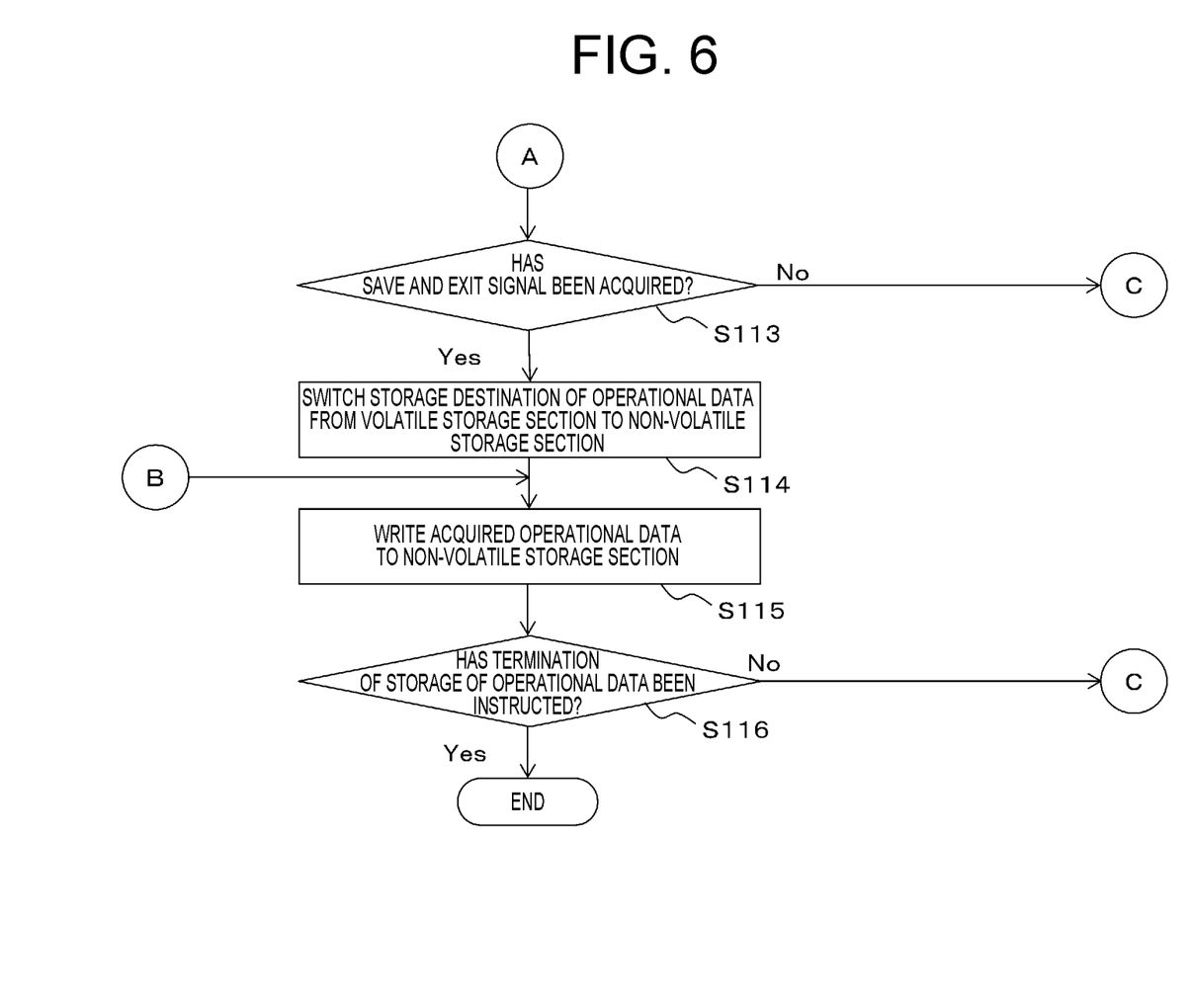
FIG. 6 is a flow chart illustrating a bottom half of the operational flow of the operational data storage device.

Referring to FIGS. 5 and 6, a description will be made about a method of storing operational data. FIG. 5 is a flow chart illustrating an upper half of an operational flow of the operational data storage device 50. FIG. 6 is a flow chart illustrating a bottom half of the operational flow of the operational data storage device 50.

When an engine of the hydraulic excavator 10 is started, a main power supply for the main controller 10 and operational data storage device 50 is turned on, and at the same time, the individual sensors mounted on the hydraulic excavator 10 begin detection processing. The data acquisition section 550 of the operational data storage device 50 acquires operational data and posture data via the main controller 20 (S101).

The write processing section 540 refers to the value of a write destination flag that specifies the write destination of the operational data. The write destination flag is a flag that indicates a storage destination of the operational data, and has been defined beforehand, for example, that the RAM 502 is the write destination if the value of the flag is "0" and the HDD 504 is the write destination if the value of the flag is "1". The write destination flag is stored in the write destination flag storage area 5021 of the RAM 502. If the write destination of the operational data is not the RAM 502, in other words, is the HDD 504 (S102/No), the processing proceeds to step S115.

If the write destination of the operational data is the RAM 502 (S102/Yes), the write processing section 540 writes the acquired operational data in the operational data temporary storage area 5022 provided beforehand in a work area of the RAM 502 (S103). In an initial state, the write destination is set in the RAM 502 (S102/Yes). As write processing at this time, operational data may be successively rewritten by new operational data with the oldest one in acquisition time series being rewritten first. If the operational data temporary storage area 5022 no longer has any available capacity, the operational data are successively deleted on first-in first-out (FIFO) basis with the oldest operational data being deleted first.

The first comparator 512 of the first tipping determination section 510 acquires a pitch angle via the main controller 20 (S104), and compares the pitch angle with its corresponding tipping pitch angle threshold read from the tipping pitch angle threshold storage section 511. If the acquired pitch angle is smaller than the tipping pitch angle threshold (S105/No), the processing proceeds to step S113.

If the acquired pitch angle is equal to or greater than the tipping pitch angle threshold (S105/Yes), the first comparator 512 outputs a comparison result signal to the first save and exit signal output device 513. Upon receipt of the comparison result signal, the first save and exit signal output device 513 generates a save and exit signal, and outputs it to the write processing section 540 (S106).

The second comparator 522 of the second tipping determination section 520 acquires a roll angle via the main controller 20 (S107), and compares the roll angle with its corresponding tipping roll angle threshold read from the tipping roll angle threshold storage section 521. If the acquired roll angle is smaller than the tipping roll angle threshold (S108/No), the processing proceeds to step S113. Otherwise (S108/Yes), the second comparator 522 outputs a comparison result signal to the second save and exit signal output device 523. Upon receipt of the comparison result signal, the second save and exit signal output device 523 generates a save and exit signal, and outputs it to the write processing section 540 (S109).

The operation monitoring section 530 analyzes operational data to monitor whether an operation by the operator departs from its corresponding standard operation. As an illustrative analysis of operational data, if bucket operation is monitored, for example, the third comparator 532 reads standard operational data, which specify bucket strokes and corresponding bucket angles, from the standard operational data storage section 531, and performs matching processing (S110). The third comparator 532 then determines whether the stroke by the operator and the bucket angle at that time fall within any one of the acceptable ranges which have each been determined beforehand including a standard operational data line L1 in FIG. 4. If the stroke by the operator and the bucket angle at that time fall within any of the acceptable ranges (S111/Yes), the processing proceeds to step S113. Otherwise (S111/No), the third comparator 532 outputs the determination result to the third save and exit signal output device 533. The third save and exit signal output device 533 generates a save and exit signal, and outputs it to the write processing section 540 (S112).

If the write processing section 540 has not acquired the save and exit signal (S113/No), the processing returns to step S101, and the temporary storage of the operational data is continued (S102/Yes, S103).

If the save and exit signal has been acquired (S113/Yes), the write processing section 540 switches the write destination of the operational data from the RAM 502 to the HDD 504 (S114). Specifically, the write processing section 540 rewrites the value of the flag in the write flag storage area 5021 to "1".

The write processing section 540 then reads the operational data, which have been temporarily stored in the RAM 502 before the time point of acquisition of the store signal, out of the operational data temporarily stored in the operational data temporary storage area 5022, and writes them in the HDD 504 (S115).

If termination processing of storage of the operational data has been executed (S116/Yes), the write processing of the operational data is ended. Otherwise (S116/No), the processing returns to S101 and is repeated.

If new operational data are next acquired (S101), the write processing section 540 refers to the flag in the write destination flag storage area 5021, and determines that the write destination of the operational data is the HDD 504 (S102/No). In Step 115, the acquired operational data are then written in the HDD 504 (S115).

According to this embodiment, operational data of a hydraulic excavator are temporarily stored in a volatile storage section in normal operation and, if a need is expected to arise later for the analysis of the operational data, for example, if an operation that would cause a tip-over or malfunction of the hydraulic excavator has been performed, it is possible to save, in a non-volatile storage section, operational data that include a stroke data representing an input operation by the operator and a movement quantity representing movement of the hydraulic excavator at the time of the input operation. As a consequence, necessary operational data can be recorded even if there is a restriction to the storage capacity of the non-volatile storage section.

The above-described embodiment is not intended to limit the present invention, and a variety of modifications is encompassed in the present invention. For example, the pitch angle and roll angle are compared with their corresponding tipping thresholds, respectively, in the tipping determination processing in the foregoing description, but the comparison may be made with respect to only one of them. In addition, the determination of a tip-over may also be made by AND calculation of the result of tipping determination based on the pitch angle and the result of tipping determination based on the roll angle.

The need for saving is determined using the tipping determination processing and the operation monitoring processing in combination in the foregoing description, but may also be determined using only one of them.

The foregoing description is made using a hydraulic excavator as an example of a work machine, but the work machine may be a wheel loader or the like. In such a modification, it is necessary to use data, which represent operational data of the work machine, instead of boom angles, arm angles and the like.

LEGENDS

10: Hydraulic excavator (mining work machine)
50: Operational data storage device

The invention claimed is:

1. An operational data storage device for storing operational data of a hydraulic excavator including an undercarriage, an upperstructure disposed so as to revolve on the undercarriage and an articulated front working device raisably and lowerably disposed on the upperstructure, wherein:
the hydraulic excavator includes:
a plurality of potentiometers that are provided on respective operating levers comprised of electric levers and configured to operate respective operating members, which construct the front working device, and the upperstructure so that stroke signals are generated corresponding to input operations by an operator,
a plurality of proportional solenoid valves that drive a plurality of actuators which actuate the respective operating members and the upperstructure in correspondence to the stroke signals from the potentiometers,
a main controller that controls the proportional solenoid valves responsive to the stroke signals,
a plurality of angle sensors that detect movement quantities of the respective operating members and upperstructure which are operated via the proportional solenoid valves, and
a posture detection sensor that detects a posture parameter of the hydraulic excavator and includes at least one of a pitch angle detection sensor that detects a pitch angle of the hydraulic excavator and a roll angle detection sensor that detects a roll angle of the hydraulic excavator;
the operational data storage device, comprising:
a storage controller including a volatile storage section and a non-volatile storage section;
wherein the storage controller is connected to the main controller, and is programmed to store operational data that include stroke data, which represent an input operations by the operator of the hydraulic excavator for at least one of the respective operating members and the upperstructure through the corresponding operating lever, and movement quantity data representing a movement quantity of the at least one of the respective operating members and the upperstructure, which operates according to the input operation,
wherein the storage controller:
stores, in an initial state, the operational data in the volatile storage section,
performs at least one of processing that generates the save and exit signal based on a first comparison between the pitch angle detected by the pitch angle detection sensor and a tipping pitch angle threshold preset to determine that the hydraulic excavator has tipped over or processing that generates the save and exit signal based on a second comparison between the roll angle detected by the roll angle detection sensor and a tipping roll angle threshold preset to determine that the hydraulic excavator has tipped over,
outputs a save and exit signal if the posture parameter detected at the posture detection sensor exceeds a predetermined posture threshold, switches, responsive to the save and exit signal, a write destination of the operational data from the volatile storage section to the non-volatile storage section, and
responsive to the save and exit signal, reads the temporarily stored operational data from the volatile storage section and writes the same in the non-volatile storage section, and to write operational data, which have been newly acquired subsequent to acquisition of the save and exit signal, in the non-volatile storage section, and
wherein the operational data storage device further comprises a standard operational data storage section programmed to store a standard stroke, which represents a standard input operation for actuating the at least one of the respective operating members and the upperstructure, and standard operational data, which specifies a standard movement quantity of the at least one of the respective operating members and the upperstructure, the standard movement quantity corresponding to the standard stroke, and
wherein the operational data storage device is programed to perform a third comparison between the stroke data out of the operational data and the corresponding one of the standard operational data, and to generate the save and exit signal according to the third comparison.

2. The operational data storage device according to claim 1, wherein:
the non-volatile storage section is programmed to continue the storage of the operational data until deletion of the operational data is instructed.

3. The operational data storage device according to claim 1, wherein:
the articulated front working device comprises a boom, arm, and bucket;
the angle sensors include an upperstructure angle sensor, boom angle sensor, arm angle sensor and bucket angle sensor that detect movement quantities of the upperstructure, boom, arm and bucket, respectively;
the stroke data includes:
a first stroke signal outputted from a first potentiometer that represents a pilot pressure corresponding to a stroke for the boom as inputted from the corresponding one of the operating levers,
a second stroke signal outputted from a second potentiometer that represents a pilot pressure corresponding to a stroke for the bucket as inputted from the corresponding one of the operating levers,
a third stroke signal outputted from a third potentiometer that represents a pilot pressure corresponding to a stroke for the arm as inputted from the corresponding one of the operating levers, and
a fourth stroke signal outputted from a fourth potentiometer that represents a pilot pressure corresponding to a revolving angle for the upperstructure as inputted from the corresponding one of the operating levers; and
the movement quantity data include:
a boom angle signal outputted by the boom angle sensor that detects an angle of actual pivoting of the boom,
a bucket angle signal outputted by the bucket angle sensor that detects an angle of actual pivoting of the bucket,
an arm angle signal outputted by the arm angle sensor that detects an angle of actual pivoting of the arm, and
a revolving angle signal outputted by the upperstructure angle sensor that detects an angle of actual revolving of the upperstructure.

* * * * *